(12) United States Patent
Aguergaray et al.

(10) Patent No.: US 8,494,014 B2
(45) Date of Patent: Jul. 23, 2013

(54) LASER DEVICE

(75) Inventors: Claude Aguergaray, Auckland (NZ); Vladimir Kruglov, Auckland (NZ); Neil Broderick, Auckland (NZ); John Harvey, Auckland (NZ); David Mechin, Lannion (FR)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 13/440,134

(22) Filed: Apr. 5, 2012

(65) Prior Publication Data
US 2012/0275474 A1    Nov. 1, 2012

Related U.S. Application Data

(60) Provisional application No. 61/473,248, filed on Apr. 8, 2011.

(51) Int. Cl.
*H01S 3/30* (2006.01)

(52) U.S. Cl.
USPC .................................. 372/6; 372/3; 372/18

(58) Field of Classification Search
USPC .................................................. 372/6, 3, 18
See application file for complete search history.

(56) References Cited

U.S. PATENT DOCUMENTS

2010/0220751 A1* 9/2010 Chong et al. ....................... 372/6
2012/0236314 A1* 9/2012 Fermann et al. ............... 356/479

* cited by examiner

*Primary Examiner* — Kinam Park
(74) *Attorney, Agent, or Firm* — Dann, Dorfman, Herrell and Skillman, P.C.

(57) ABSTRACT

A laser apparatus for producing mode locked pulses includes a closed optical system adapted to connect to a fiber grain medium to form a laser cavity. The fiber gain medium is adapted to receive pulses characterized by a first state and to output pulses characterized by a second state. The closed optical system is adapted to receive the pulses in the second state and output pulses in a state similar to the first state.

47 Claims, 6 Drawing Sheets

LASER DEVICE

REFERENCE TO PRIOR APPLICATION

This application claims the benefit of U.S. Provisional Application No. 61/473,248, filed Apr. 8, 2011 the entirety of which is incorporated herein by reference.

FIELD OF THE INVENTION

The present invention relates to lasers, and more particularly to pulsed laser sources.

BACKGROUND TO THE INVENTION

Fibre oscillators such as erbium or ytterbium doped fibre lasers as well as Raman amplifiers are reliable devices which are used in many different technology fields such as telecommunications, optical imaging, healthcare and metrology. Much effort has been dedicated to increasing the peak power of the pulses delivered by fibre based lasers as their stability and compact size make them an attractive alternative to bulky solid-state lasers. A particular limitation of pulsed fibre based lasers is the nonlinear phase limit leading to a wave breaking effect leading to degradation of the pulse shape. Fibre lasers also require dispersion management to allow group velocity and self-phase modulation induced chirp to interplay. Each factor limits the potential output power.

A type of waveform known as a parabolic pulse has been developed to overcome the difficulties of nonlinearity and enable high energy fibre based lasers to be constructed. A parabolic pulse retains its parabolic temporal profile during propagation in an optical fibre, also known as self similar propagation. A parabolic pulse can experience very large nonlinearity without suffering from the wave-breaking effect. The temporal and spectral parabolic intensity profiles and linear positive chirp are conserved during propagation. A propagating parabolic pulse has temporal and spectral widths that increase exponentially along the fibre. These specific aspects of parabolic pulse propagation makes them suitable for high powered applications since the linear chirp of such a pulse enables simple pulse compression to shorten the duration.

A variety of laser architectures have also been proposed to obtain parabolic pulse propagation. Such architectures, however, utilise free-space components to compress or mode-lock a laser. Despite good performance of such cavities, they are not compact or robust. Further, such lasers also suffer from having to couple light in and out of a fibre, leading to stability and inefficiency problems.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide a laser that produces pulses to overcome or at least ameliorate some of the abovementioned disadvantages or which at least provides the public with a useful choice. Other objects of the invention may become apparent from the following description which is given by way of example only.

SUMMARY OF THE INVENTION

In one aspect the invention relates to a laser apparatus for producing mode locked pulses comprising:

a fibre gain medium and a closed optical system, the fibre gain medium having an output connectable to an input of the closed optical system, the closed optical system having an output connectable to an input of the fibre gain medium to thereby form, when connected, a laser cavity, the fibre gain medium adapted to receive pulses characterised by a first state and output pulses characterised by a second state at an output, the first state being different to the second state, wherein the closed optical system is adapted to receive the pulses in the second state and output pulses in a state at least substantially similar to the first state.

In a further aspect the invention relates to laser apparatus for producing mode locked pulses comprising:

a closed optical system adapted to connect to a fibre gain medium to thereby form, when connected, a laser cavity, the fibre gain medium adapted to receive pulses characterised by a first state and output pulses characterised by a second state at an output, the first state being different to the second state, wherein the closed optical system is adapted to receive a pulse in a first state and convert the pulse to a second state, wherein conversion is opposite to that in which the fibre medium would impart.

In a further aspect the invention relates to a method of operating a laser apparatus comprising:

adapting a closed optical system for use with a fibre gain medium to thereby form, when adapted, a laser cavity, mode locking the laser using a mode locking device, adapting the fibre gain medium to receive pulses characterised by a first state and output pulses characterised by a second state at an output, the first state being different to the second state, receiving, in the closed optical system, a pulse in a first state and the closed optical system converting the pulse to a second state, wherein conversion is opposite to that in which the fibre medium would impart.

In a further aspect the invention relates to a method of operating a laser apparatus comprising:

providing a fibre gain medium and a closed optical system, the fibre gain medium having an output connectable to an input of the closed optical system, the closed optical system having an output connectable to an input of the fibre gain medium to thereby form, when connected, a laser cavity, mode locking the laser using a mode locking device, providing the fibre gain medium adapted to receive pulses characterised by a first state and output pulses characterised by a second state at an output, the first state being different to the second state, adapting the closed optical system to receive the pulses in the second state and output pulses in a state at least substantially similar to the first state.

The following preferred statements may relate to any of the above aspects.

Preferably the pulses in at least the second state are parabolic in temporal profile.

Preferably the pulses in at least the second state are parabolic in spectral profile.

Preferably the pulses in the second state are broader in spectral and temporal profile that the pulses in the first state.

Preferably the optical system comprises a temporal pulse selection device, the temporal pulse selection device adapted to select a portion of the temporal width of a pulse.

Preferably the temporal pulse selection device is adapted to select a portion of the spectral width of a pulse.

Preferably the temporal pulse selection device shortens the temporal width of a pulse by virtue of selecting a portion of the spectral width of the pulse.

Preferably the temporal pulse selection device is a band pass filter.

Preferably the temporal pulse selection device is a pulse recompression device.

Preferably the optical system further comprises a mode locking device.

Preferably the mode locking device is a non linear optical loop mirror.

Preferably the non linear optical loop mirror comprises an optical coupler having at least two inputs, two outputs and a length of highly nonlinear fibre interposed between at least one of the inputs and one of the outputs.

Preferably the optical system further comprises a band pass filter.

Preferably the pulses in the second state are characterised by a linear positive chirp.

Preferably the fibre gain medium comprises a length of optical fibre and a source of pump light, the pump coupled into and out of the optical fibre by a broadband optical coupler.

Preferably the pump wavelength is tuneable to thereby provide to tune the wavelength of the pulses.

Preferably the fibre gain medium further comprises an optical isolator.

Preferably the laser apparatus further comprises an output coupler located at the output of the fibre gain medium.

Preferably the output coupler is connected to a pulse recompression device.

Preferably the optical system is closed by virtue of not comprising free space optical components.

Preferably the optical system comprises an output coupler defining an input to the optical system, the output coupler operable to couple a portion of the light in the system from the system, the output coupler connectable to a temporal pulse selection device, the temporal pulse selection device connectable to a mode locking device, the mode locking device connectable to a filter, the filter defining the output of the optical system.

Preferably the optical system further comprises an optical isolator located in series with the fibre gain medium.

Preferably the laser apparatus is operational to generate a pulse that propagates through the gain medium and the optical system, wherein the pulses develop substantially the same temporal profile and spectral profile at each round trip.

Preferably the laser apparatus is operational substantially within the normal dispersion regime.

Preferably at least the optical system comprises optical fibre based devices, silicon based devices, or some combination thereof.

Preferably the laser apparatus is operational to generate a pulse having a centre frequency located at, or substantially similar to, the pass band of the filter.

Preferably the fibre medium is a Raman gain medium.

Alternatively the fibre medium is a doped gain medium.

Preferably the doped gain medium is rare earth doped fibre medium.

Preferably the rare earth doped fibre medium is Ytterbium or Erbium.

In a further aspect the invention relates to a laser apparatus for producing laser pulses comprising:

a gain medium in a fibre optical system, the gain medium having an output connectable to an input of the fibre optical system, the fibre optical system having an output connectable to an input of the gain medium to thereby form, when connected, a laser cavity, the gain medium adapted to receive pulses characterised by a first state and output pulses characterised by a second state at an output, the first state being different to the second state, wherein the fibre optical system is adapted to receive the pulses in the second state and output pulses in a state substantially similar to the first state.

Preferably the fibre optical system is adapted to output pulses in a state substantially similar to the first state by imparting an optical effect opposite to that imparted by the gain medium.

Preferably the gain medium is a Raman gain medium.

Preferably the gain medium is a doped fibre gain medium.

Preferably the pulses in at least the second state are substantially parabolic in temporal profile.

Preferably the pulses in at least the second state are substantially parabolic in spectral profile.

Preferably the pulses in the second state are broader in spectral and temporal profile that the pulses in the first state.

Preferably the fibre optical system comprises a temporal pulse selection device, the temporal pulse selection device adapted to select a portion of the temporal width of a pulse.

Preferably the temporal pulse selection device is adapted to select a portion of the spectral width of a pulse.

Preferably the temporal pulse selection device shortens the temporal width of a pulse by virtue of selecting a portion of the spectral width of the pulse.

Preferably the temporal pulse selection device is a band pass filter.

Preferably the temporal pulse selection device is a pulse recompression device.

Preferably the fibre optical system further comprises a mode locking device.

Preferably the mode locking device is a non linear optical loop mirror.

Preferably the non linear optical loop mirror comprises an optical coupler having at least two inputs, two outputs and a length of highly nonlinear fibre interposed between at least one of the inputs and one of the outputs.

Preferably the fibre optical system further comprises a band pass filter.

Preferably the pulses in the second state are characterised by a linear positive chirp.

Preferably the gain medium comprises a length of optical fibre and a source of pump light, the pump coupled into and out of the optical fibre by an optical coupler.

Preferably the pump wavelength is tuneable to enable the wavelength of the pulses to be tuned.

Preferably the gain medium further comprises an optical isolator.

Preferably the laser apparatus further comprises an output coupler located at the output of the gain medium.

Preferably the output coupler is connected to a pulse recompression device.

Preferably the fibre optical system is closed by virtue of not comprising free space optical components.

Preferably the fibre optical system is closed by virtue of comprising fibre based components.

Preferably the fibre optical system comprises a fibre coupler defining an input to the fibre optical system and an output from the fibre optical system, the fibre coupler connectable to a temporal pulse selection device, the temporal pulse selection device connectable to a mode locking device, the mode locking device connectable to a gain medium and an optical isolator via an optical filter, the gain medium connectable to the fibre coupler.

Preferably the laser is operational to generate a pulse that propagates through the gain medium and the fibre optical system, wherein the pulses develop substantially the same temporal profile and spectral profile at each round trip.

Preferably the laser apparatus is operational substantially within the normal dispersion regime.

Preferably the laser comprises optical fibre based devices, silicon based devices, or some combination thereof.

Preferably the laser is operational to generate a pulse having a centre frequency located in, or substantially aligned with, the pass band of the filter.

In a further aspect the invention relates to an optical system for producing mode-locked laser pulses comprising:
  a gain medium,
  a fibre optical system, the fibre optical system comprising a mode locking device, a temporal pulse selection device and a spectral filter,
  wherein the gain medium has an output connected to an input of the fibre optical system,
  the fibre optical system having an output connected to an input of the gain medium to thereby form a laser cavity or ring, the gain medium adapted to receive pulses characterised by a first state and output pulses characterised by a second state at an output, the first state being different to the second state,
  wherein the fibre optical system is adapted to receive the pulses in the second state and output pulses in a state substantially similar to the first state.

Preferably the fibre optical system is adapted to output pulses in a state substantially similar to the first state by imparting an optical effect opposite to that imparted by the gain medium.

Preferably the gain medium is a Raman gain medium.

Preferably the gain medium is a doped fibre gain medium.

Preferably the pulses in at least the second state are substantially parabolic in temporal profile.

Preferably the pulses in at least the second state are substantially parabolic in spectral profile.

Preferably the pulses in the second state are broader in spectral and temporal profile that the pulses in the first state.

Preferably the fibre optical system comprises a temporal pulse selection device, the temporal pulse selection device adapted to select a portion of the temporal width of a pulse.

Preferably the temporal pulse selection device is adapted to select a portion of the spectral width of a pulse.

Preferably the temporal pulse selection device shortens the temporal width of a pulse by virtue of selecting a portion of the spectral width of the pulse.

Preferably the temporal pulse selection device is a band pass filter.

Preferably the temporal pulse selection device is a pulse recompression device.

Preferably the fibre optical system further comprises a mode locking device.

Preferably the mode locking device is a non linear optical loop mirror.

Preferably the non linear optical loop mirror comprises an optical coupler having at least two inputs, two outputs and a length of highly nonlinear fibre interposed between at least one of the inputs and one of the outputs.

Preferably the closed optical system further comprises a band pass filter.

Preferably the pulses in the second state are characterised by a linear positive chirp.

Preferably the gain medium comprises a length of optical fibre and a source of pump light, the pump coupled into and out of the optical fibre by an optical coupler.

Preferably the pump wavelength is tuneable to enable the wavelength of the pulses to be tuned.

Preferably the gain medium further comprises an optical isolator.

Preferably the laser apparatus further comprises an output coupler located at the output of the gain medium.

Preferably the output coupler is connected to a pulse recompression device.

Preferably the fibre optical system is closed by virtue of not comprising free space optical components.

Preferably the fibre optical system is closed by virtue of comprising fibre based components.

Preferably the fibre optical system comprises a fibre coupler defining an input to the fibre optical system and an output from the fibre optical system, the fibre coupler connectable to a temporal pulse selection device, the temporal pulse selection device connectable to a mode locking device, the mode locking device connectable to a gain medium and optical isolator via an optical filter, the gain medium connectable to the fibre coupler.

Preferably the laser is operational to generate a pulse that propagates through the gain medium and the closed optical system, wherein the pulses develop substantially the same temporal profile and spectral profile at each round trip.

Preferably the laser is operational substantially within the normal dispersion regime.

Preferably the laser comprises optical fibre based devices, silicon based devices, or some combination thereof.

Preferably the laser is operational to generate a pulse having a centre frequency located in, or substantially aligned with, the pass band of the filter.

In a further aspect the invention relates to a method of operating a laser apparatus comprising:
  providing a fibre optical system and a gain medium,
  optically coupling the fibre optical system to a gain medium to form a laser cavity or ring,
  adapting the gain medium to receive pulses characterised by a first state and output pulses characterised by a second state at an output, and
  adapting the fibre optical system to receive a pulse characterised by the first state and output pulses characterised by the first state.

Preferably the method further comprising imparting, in the fibre optical system, an optical effect opposite to that imparted by the gain medium.

Preferably optical effect in the gain medium is broadening the spectral width of the pulse and the optical effect in the fibre optical system is narrowing the spectral width of the pulse.

Preferably said gain medium operates to support pulses characterised by a linear positive chirp.

Preferably said fibre optical system operates to support pulses characterised by a linear positive chirp.

Preferably the gain medium operates to produce pulses in the second state that are broader in spectral and temporal profile than the pulses in the first state.

Preferably providing a fibre optical system comprises providing a temporal pulse selection device, the temporal pulse selection device adapted to select a portion of the spectral and/or temporal width of a pulse.

Preferably the temporal pulse selection device shortens the temporal width of a pulse by virtue of selecting a portion of the spectral width of the pulse.

Preferably providing a fibre optical system comprises providing a band pass filter as the temporal pulse selection device.

Preferably the method comprises providing a mode locking device.

Preferably the method comprises mode locking the laser with the mode locking device.

Preferably the method comprises outputting light from the laser by providing an optical coupler having at least two inputs, two outputs and a length of highly nonlinear fibre interposed between at least one of the inputs and one of the outputs.

Preferably the method further comprises tuning a centre wavelength of the pulses by providing a band pass filter in the fibre optical system.

Preferably the method further comprises preventing reverse pulse propagation by providing a optical isolator in the fibre optical system.

Preferably the method further comprises providing a fibre coupler defining an input to the fibre optical system and an output from the fibre optical system, connecting the fibre coupler to a temporal pulse selection device, connecting the temporal pulse selection device to a mode locking device, connecting the mode locking device to a filter and selecting an operating wavelength, connecting the filter to a gain medium and optical isolator, and connecting the gain medium to the fibre coupler.

Preferably the method further comprises operating the laser to generate a pulse that propagates through the gain medium and the fibre optical system, wherein the pulses develop substantially the same temporal profile and spectral profile at each round trip.

Preferably the method further comprises propagating a pulse in the cavity or ring substantially within the normal dispersion regime.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification and claims means "consisting at least in part of". When interpreting statements in this specification and claims which include that term, the features, prefaced by that term in each statement or claim, all need to be present but other features can also be present. Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. The following embodiments may relate to any of the above aspects.

BRIEF DESCRIPTION OF THE DRAWINGS

The invention will now be described by way of example only and with reference to the drawings in which.

DETAILED DESCRIPTION OF THE INVENTION

Figure 1:
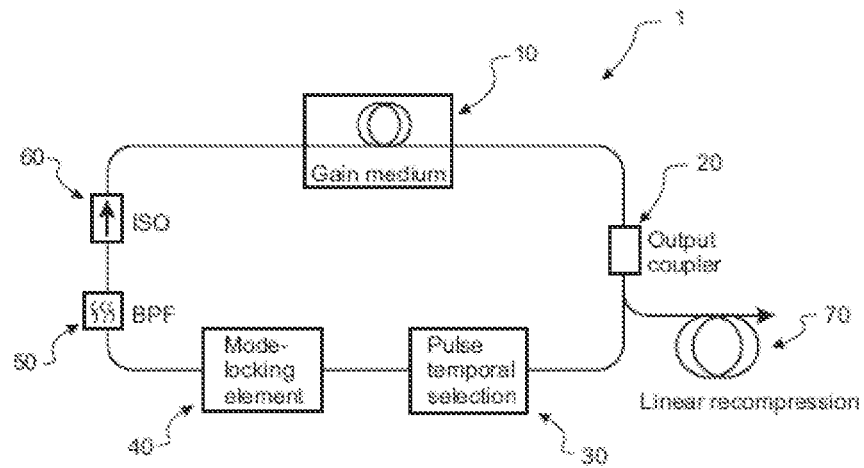
FIG. 1 which shows a cavity ring laser.

Laser cavities for generating parabolic pulses or sustaining self similar propagation are difficult to implement as periodic repetition of the pulse shape is difficult to control, thereby making it difficult to implement periodic boundary conditions required to ensure the laser will operate. Such boundary conditions include maintaining substantially the same pulse characteristics at a consistent location during each round trip of the laser cavity. Such characteristics include the pulse temporal shape and the pulse spectral shape Due to these problems, the prior art has not provided a solution for implementing a mode-locked laser that avoids the use of free space components with all-normal dispersion for generating parabolic pulses or implementing self-similar propagation.

It is of great interest to develop a laser that generates parabolic pulses using a fibre gain medium. Raman gain media has been used to construct a parabolic pulse amplifier, however, the prior art has not successfully used a Raman gain medium to construct a laser cavity. It is also of particular interest to generate parabolic pulses with a laser having a doped fibre gain medium, such as Erbium or Ytterbium, because of the high pulse repetition rates these gain mediums provide.

Due to the long lengths of Raman gain medium (several kilometers) as compared to rare-earth doped fibre gain mediums (10s of meters) the design of a mode locked laser using a Raman gain medium is completely new. Since nonlinear effects acting on a propagating pulse are balanced by the gain, nonlinearity and dispersion along the cavity length the dynamics of a pulse propagating in a Raman gain medium change markedly. The cavity length is larger by several orders of magnitude. Further, in a Raman gain medium, double Rayleigh backscattering noise becomes an important issue to solve. A laser with a Raman gain medium therefore requires additional components compared to a rare-earth doped fibre system, increasing the complexity of the laser cavity design. A long Raman gain medium also leads to very long pulses and very large chirp. Large chirp leads to very high pulse breathing also making it difficult to obtain stable pulsed operation.

According to an aspect of the invention the inventors have ascertained stable mode-locked operation delivering parabolic pulses can be obtained without a dispersion compensation stage. To obtain asymptotic self-similar propagation in the shortest length of fibre possible, the pulse input to the gain medium must not have any chirp.

Herein described is a stable operating regime which leads to a stable laser that generates self-similar parabolic pulses using a Raman gain medium, although other gain mediums such as doped fibres could also be used.

To respect the boundary condition of the laser, the pulse must have the same shape and spectrum after one round trip of the laser cavity. As a self-similar pulse will temporally and spectrally broaden during its propagation through the Raman gain medium, pulse compression must be implemented. A Raman gain medium also provides the advantage of having a wide tuning range when coupled with a tuneable Raman pump source. For example, a Raman pump will provide Raman gain at a frequency offset of 13.2 THz. Therefore by tuning the pump wavelength, the available Raman gain wavelength range can also be tuned to provide a widely tuneable laser output, a feature not available with the use of doped fibre amplifiers.

An embodiment of the laser will now be broadly described with reference to FIG. 1 which shows a cavity ring laser 1. The preferred cavity 1 is built using entirely optical fibre based components or integrated components or silicon photonics components or some combination thereof to form an optical system that does not utilise free space optical components. This laser cavity may be referred to as a closed optical system. The use of optical fibres and other non free space devices provides a robust laser that is substantially isolated from environmental influences, such as vibration, which can cause cavity misalignment and prevent lasing.

The cavity ring laser 1 is a device operating in a balanced operation. That is, input light pulses are generated and sustained within the cavity, undergoing various optical effects in the sequentially connected components in one round trip. The optical effects and sustainment of these light pulses is hereby described with reference to the components in the cavity.

A gain medium 10 is provided to provide amplification to input light. The gain medium 10 is preferably an enclosed medium such as an optical fibre, but may also be embodied by other enclosed mediums such as semiconductors or integrated packages. The gain medium 10 most preferably provides self-similar amplification to input light pulses. The gain medium may be any suitable medium that respects the required conditions for self-similar pulse propagation whereby input pulses evolve into a similariton with a parabolic shape and a linear chirp. The gain medium 10 is most preferably a Raman gain medium. Preferably the gain medium 10 has a pump source to stimulate the amplification process.

The output of the gain medium 10 is connected to an output coupler 20 which allows coupling of a portion of the light power in the cavity to be diverted. The light pulses diverted from the cavity 1 are similaritons which advantageously lend themselves to an optional linear pulse compression stage 70. The coupler diverts approximately 10% of the power from the cavity. However, this quantity may be tuned depending on the pulse power generated by the gain medium 10, the power desired at the output and other factors that influence pulse propagation.

The remaining portion of light not diverted from the cavity by the coupler 20 is input to a temporal pulse selection device 30. The purpose of the pulse selection device 30 is to reduce the pulse duration before being input to a mode locking device 40. The temporal pulse selection device is preferably implemented by a band pass filter. The pulses entering the device 30 have a large magnitude of chirp. Therefore, the reduction in spectral range provided by the device 30 also advantageously shortens the pulse duration. Preferably, a band pass filter having a narrow pass band, such as 0.2 nm, selects a narrow portion of the input pulse. Alternatively, the device 30 may be a linear recompression stage. A linear recompression stage may be implemented by devices such as a fibre grating compressor.

The aforementioned mode locking device 40 receives light output from the temporal pulse selection device 30 and provides the formation of short mode locked pulses within the cavity 1. The mode locking device 40 may be implemented with by variety of devices or physical processes. Preferably the mode locking device 40 is a nonlinear optical loop mirror (NOLM). A NOLM uses interference between two pulses of different intensity after they have propagated through an optical fibre under the influence of nonlinear effects. In a NOLM, only the central parts of the pulses interfere constructively and are transmitted. The outer regions of the pulses interfere destructively and are nullified. The mode locking device 40 may alternatively be implemented by a saturable absorption mirror. Or alternatively still, by using a nonlinear polarisation evolution process. Where a NOLM is to be used as the mode locking device 40, it is preferable to use a 45/55 coupler where two opposing ends are in optical connection. Between the opposing ends it is preferable to use a highly nonlinear medium, such as PCF fibre or similar.

Light output from the mode locking device 40 is provided to a band pass filter 50. The filter 50 provides spectral narrowing to the pulses. The filter 50 is most preferable when a NOLM is implemented for the mode locking device 40 as a NOLM will typically spectrally broaden the light pulses a significant amount due to self phase modulation effects in the highly nonlinear medium. Self phase modulation will also typically accumulate positive temporal chirp. It is most desirable to remove this chirp before re-entry of the light propagating in the cavity 1 into the gain medium 10, particularly when the gain medium 10 is a Raman amplifier. The smaller the chirp on the pulse input to the gain medium 10, the faster the pulse stabilises in the cavity 1 and sustains a self similar propagation state.

The external recompression device 70 is provided where it is desirable to compress the pulse to its closest point to the Fourier limit as possible. To implement the pulse recompression device 70 a number of devices may be used. For example, a grating compressor arrangement, a prism pair, a length of optical fibre, chirped mirrors, chirped fibre Bragg grating or a volume Bragg grating may be used.

It should be noted that a pulse recompression device could be implemented within the cavity to provide substantial shortening, and thus a substantial peak power increase to the pulse. Other implementations of the various functional components of the cavity will be apparent to those skilled in the art and it should be noted that the implementations provided are not intended to be an exhaustive list. Further, where the cavity is desired to be tuneable, particular parameters relating to the functional components may also be changed where appropriate.

Figure 2:
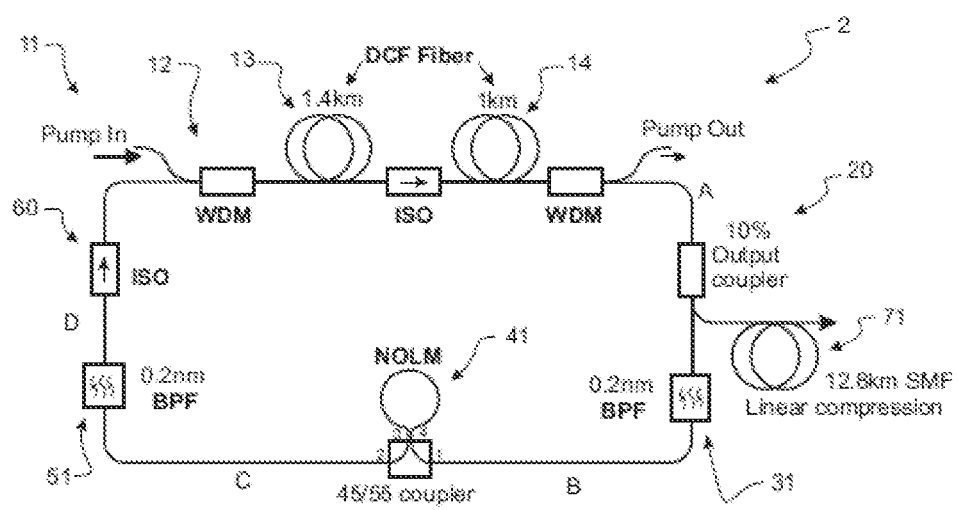
FIG. 2 shows a particular embodiment of the cavity ring laser of FIG. 1.

A particular implementation of the preferred embodiment of the laser is shown in FIG. 2. The gain medium 10 is preferably a Raman gain medium. The Raman gain medium is implemented by two lengths of dispersion compensated fibre (DCF) 13, 14 located about and sequentially connected with an isolator 15. A Raman pump source 11 is channelled into the gain medium 10 via a WDM coupler 12. In one implementation of the Raman gain medium the DCF fibre 13, 14 lengths are 1.4 km and 1 km respectively to form approximately a 2.4 km total active length. The DCF fibre has dispersion properties of −111.3 ps/nm/km at 1535 nm. The pump source 11 for the Raman gain medium is preferably a tuneable continuous wave light source. The isolator 15 located between the fibre lengths 13, 14 limits the double Rayleigh-Bragg scattering and promotes a unidirectional lasing direction in the cavity 1. A second WDM coupler 16 removes the pump light from the cavity and ends the gain medium.

A band pass filter 31 is implemented as the temporal pulse selection device 30. The filter 31 has a pass band width of 0.2 nm to shorten the pulse spectrally and therefore temporally.

A NOLM 41 is implemented as the mode locking device 40. The NOLM is implemented with a 45/55 coupler. The two ends of the coupler (denoted as ends 3 and 4 in FIG. 2) are looped together with 727 m of highly nonlinear fibre in between. The fibre used has parameters of 0.21 ps/nm/km at 1550 nm, a core diameter of 3.2 um and a non linear coefficient of 0.0121 $W^{-1}m^{-1}$.

The band pass filter 51 located after the NOLM has a pass band width of 0.2 nm. The filter 51 removes a large part of the pulse spectrum, but also ensures the pulse entering the Raman gain medium has very low chirp. The pulse thereby retains the important characteristics required to sustain self similar pulse propagation, low residual chirp and pulse energy.

The external recompression device 70 is implemented by a length of single mode fibre 71. The fibre 71 has length of 12.8 km and an anomalous dispersion parameter of 15.3 ps/nm/km at 1550 nm. With this fibre, pulses having a length of 6 ps can be practically compressed close to the Fourier limit of approximately 3 ps.

The laser of according to the above embodiments has been developed using a numerical model based on simulation of the generalised nonlinear Schrödinger equation. Each section of the laser is described with appropriate parameters based on readily available components. The simulation uses the split-step Fourier method with a large number of round trips, N, of the propagating field. The laser is seeded with an initial pulse and stable operation regime with a parabolic output is obtained after a large number of round trips N. Where N>>1, the energy of the initial pulse in the round trip with number N is equal to the energy of the pulse at the end of the roundtrip. The generalised nonlinear Schrödinger equation is given by:

$$i\frac{\partial \psi_s}{\partial z} = \frac{\beta_s}{2}\frac{\partial^2 \psi_s}{\partial \tau^2} - \gamma_s|\psi_s|^2\psi_s + i\frac{g_s}{2}\psi_s + i\frac{\sigma_g}{z}\frac{\partial^2 \psi_s}{\partial \tau^2}$$

where $\Psi_S(z,\tau)$ is the complex envelope of the electric field in a co-moving frame, $\tau$ is the retarded time, $\beta_S$=0.1388 $ps^2/m$ is the normal group velocity dispersion (GVD) parameter, $\gamma_S$=0.0057 W−1m−1 is the nonlinearity parameter, $g_S$=g−$\alpha_S$=0.0024 $m^{-1}$ is the effective Raman gain parameter where $\alpha_S$=0.5 dB/km is the loss parameter, and $\sigma$=1/$\Omega_g^2$ is the parameter of the bandwidth-limited gain in the fibre.

For a parabolic or similariton operating regime of the laser, the last term in the above equation is very small compared with amplification terms and can be ignored. Components of the laser such as fibre couplers and fibre isolators are taken into account by integrating their respective loss in the simulation. Gaussian filters are defined by the frequency function H($\omega$)=exp($-\tau_b^2\omega^2/2$) where $\tau_b$ is the filter width.

A weak parabolic pulse is used as a seed in the laser leading to robust parabolic regime after propagation over a large number of roundtrips. During its propagation in the Raman gain medium, the pulse reaches the parabolic asymptotic solution described by following equations:

$$\psi_2(\tau) = A_s\sqrt{1-\left(\frac{\tau}{\tau_s}\right)^2}\exp[i\Phi_s(\tau)]\theta(\tau_s - |\tau|)$$

$$A_s = \frac{1}{2}\left(\frac{2g_s^2 E_0^2}{\beta_s\gamma_s}\right)^{\frac{1}{6}}\exp\left(\frac{1}{3}g_s l_s\right)$$

where $A_S$ is the amplitude and $\theta(\tau)$ is the Heaviside step function. The width $\tau_S$ and the phase $\Phi_S(\tau)$ of the similariton pulse are $$\tau_s = 3\left(\frac{\beta_s\gamma_s E_0}{2g_s^2}\right)^{\frac{1}{3}}\exp\left(\frac{1}{3}g_s l_s\right)$$

$$\Phi_s(\tau) = \Phi_s + \frac{3\gamma_s}{2g_s}A_s^2 - \frac{g_s}{6\beta_s}\tau^2$$

Figure 3:
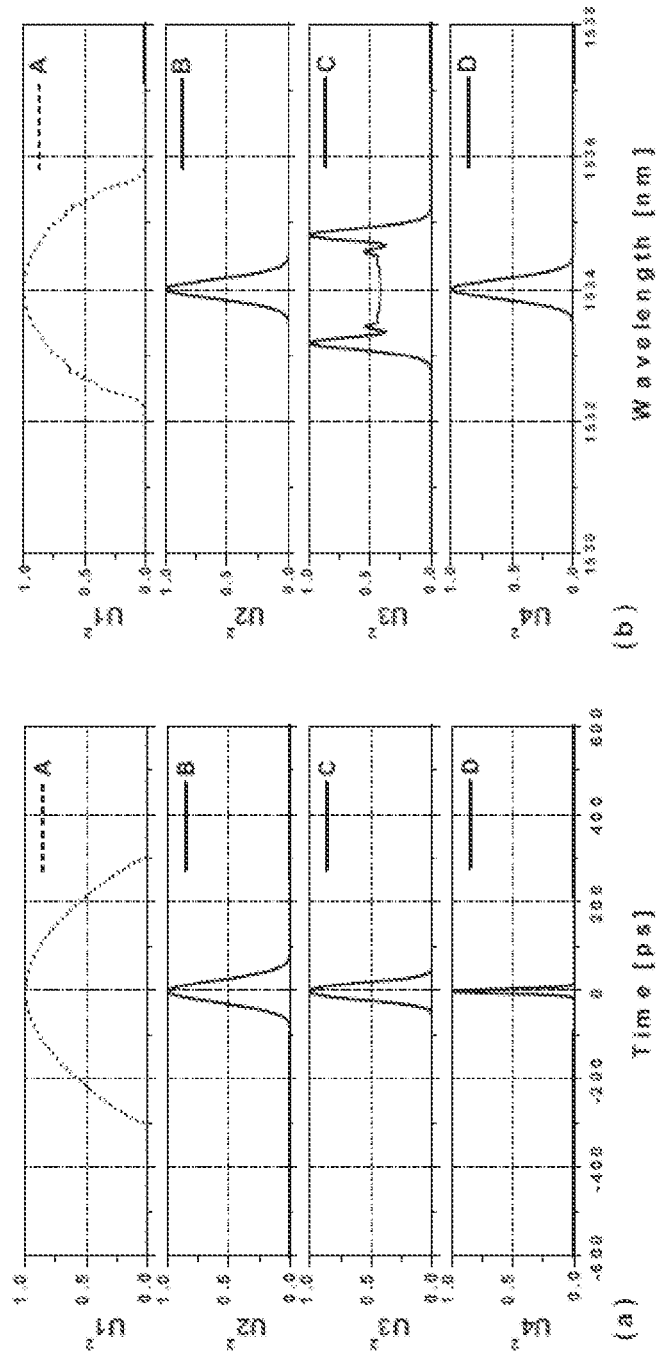
FIG. 3 shows the simulated spectra and temporal intensities at different places in the cavity of FIG. 2.

By using manufacturer data for different fibre parameters, the optimal length $l_S$ of the fibre amplifier necessary to reach the self-similar propagation can be calculated. FIG. 3 shows the simulated spectra and temporal intensities at different places in the cavity at locations A, B, C and D denoted around the cavity 2 in FIG. 2. FIG. 3a shows simulated temporal profiles and FIG. 3b shows spectral densities on a normalized scale. The output of the laser is shown in FIGS. 3a and 3b at cavity location A. At point A, both the temporal pulse profile and the spectral pulse profile have a parabolic shape.

There are at least two different stable operational regimes for this mode-locked ring laser when varying the input parameters. The operational regimes correspond to a period of one or two roundtrips in the cavity. The operational regime under which the laser is self-stabilising mainly depends on the bandwidth of the first band pass filter 31 in combination with other parameters of the cavity components. Single mode fibre patch cord used to link the different components of the cavity are omitted from the simulations as the accumulated length is approximately 15 m for a total cavity length of approximately 3100 m.

Figure 4:
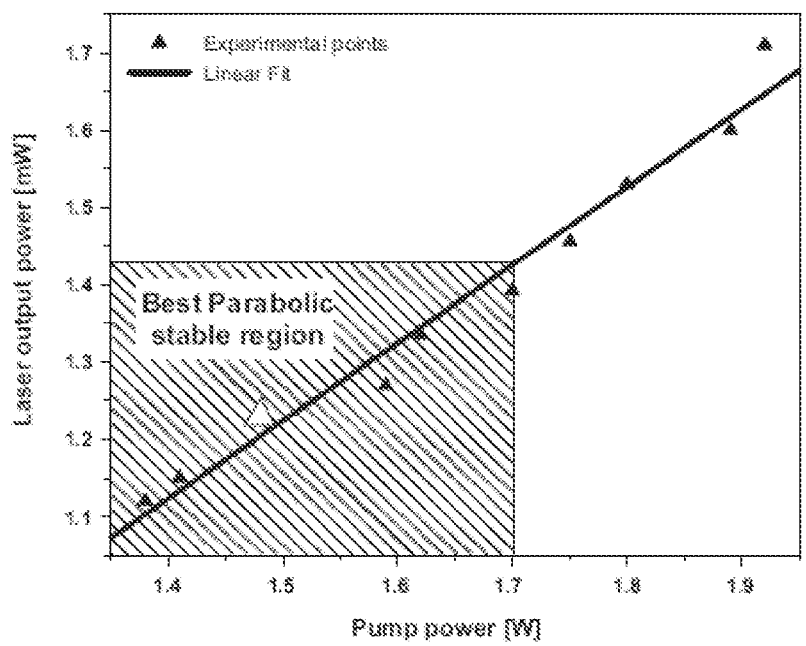
FIG. 4 shows a graph of the cavity output power with respect to the pump power.

FIG. 4 shows a graph of the cavity output power with respect to the pump power. The lasing threshold is high due to the particular components used in the cavity itself. A small fraction of the total energy exiting the amplifier arrives to the NOLM 41 due to the presence of the filter 31. The pump power should be increased to a high magnitude to initiate self mode-locking. A pump power of between 1.35 W and 2 W has been identified to enable stable operation without losing mode locking, distorting the propagating pulse or generating unwanted extra pulses. Varying the pump power across the described power range allows identification of the region where the interplay between the dispersion, the nonlinearity and the gain is optimal for parabolic pulse or similariton generation.

Figure 5:
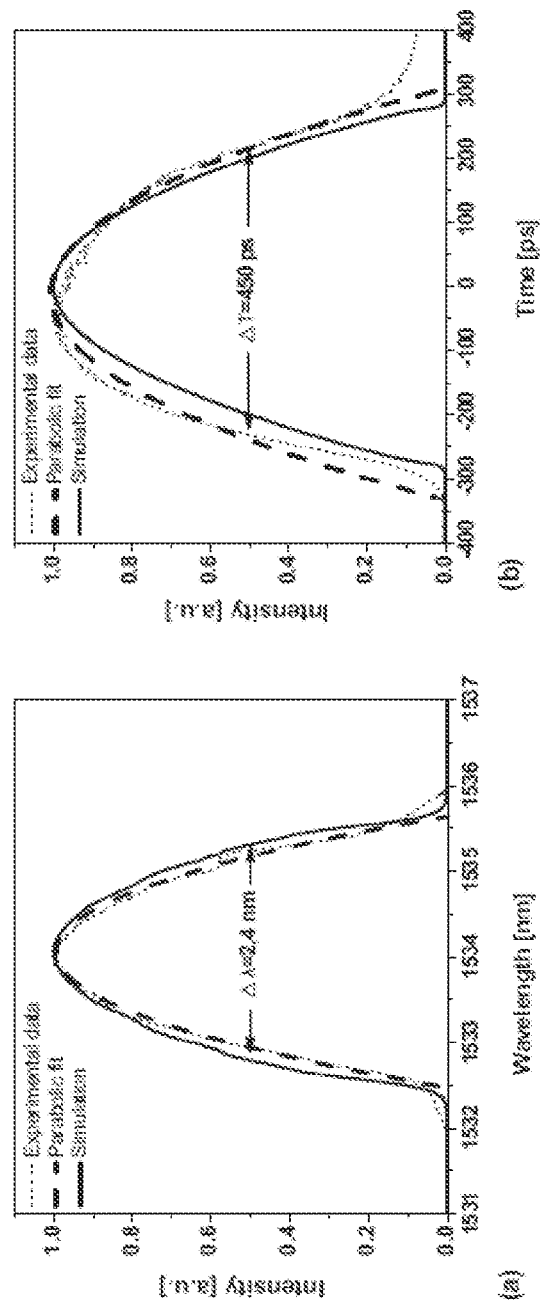
FIG. 5 show the experimentally obtained spectral density profiles and temporal profiles of the pulse at the laser output for a pump power of 1.5 W.
Figure 6:
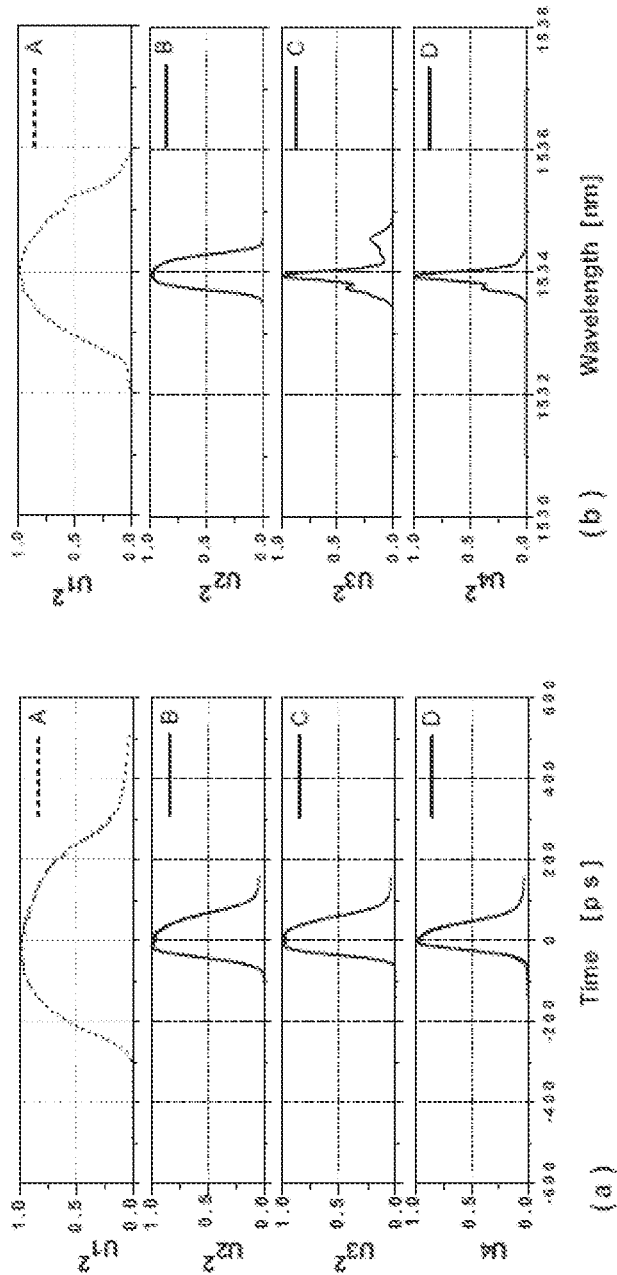
FIG. 6 shows the experimentally obtained spectral density and temporal profiles of the pulse at locations denoted in FIG. 2

FIGS. 5a and 5b show the experimentally obtained spectral density and temporal profiles of the pulse at the laser output for a pump power of 1.5 W. At this power level, the output pulses have energy of 22 nJ, a 64 kHz repetition rate, a bandwidth of 2.4 nm and a duration of approximately 450 ps. An increase in the pulse bandwidth is observable as the pump power is increased from laser threshold to 2 W. This behaviour is characteristic of the self-similar propagation regime taking place in the Raman gain medium. FIGS. 6a and 6b show the experimentally obtained spectral density and temporal profiles of the pulse at locations denoted in FIG. 2.

Figure 7:
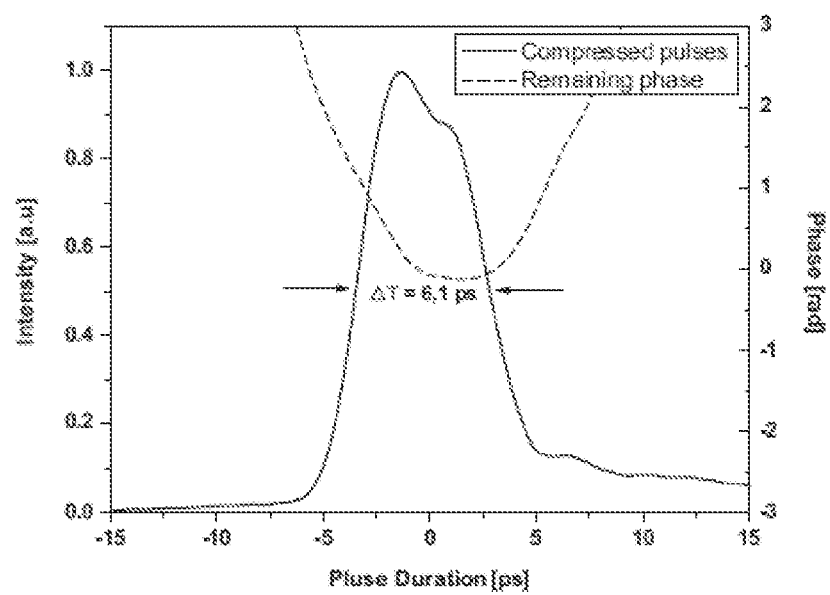
FIG. 7 shows a FROG measurement of the temporal intensity distribution of the 6 ps compressed pulse.

An external recompression system can be used to recompresses the pulses to 6 ps using 12.8 km of SMF28(e) optical fibre. FIG. 7 shows a FROG measurement of the temporal intensity distribution of the 6 ps compressed pulse. The temporal phase on the recompressed pulse, as shown by the dashed curve in FIG. 7, has been compensated and it is close to zero for a large portion of the pulse.

Use of a Raman gain medium allows potential operation of the laser cavity at any wavelength in the Raman gain bandwidth, assuming appropriate changes to the bandwidth of the components in use or at any wavelength assuming a change to the pump wavelength. The 22 nD output similariton pulses have a true parabolic shape both in the time and spectral domains and a linear chirp. Linear recompression close to Fourier limit is demonstrated allowing us to obtain 6 ps compressed pulses with a compression factor of 75.

In alternative embodiments the gain medium may be any fibre gain medium known in the art. In one embodiment the gain medium is a Ytterbium doped gain single mode fibre medium which provides a higher gain per unit length than a Raman gain medium operating in the region of 1 micrometer. This allows a shorter cavity length and corresponding higher repetition rate for the pulsed or mode-locked output.

The mode-locked laser is free of dispersion compensation components and can be considered to operate entirely in normal dispersion regime since the practical length of the SMF patch-cords between the elements is negligible compared to the length of the DCF serving as Raman gain medium (SMF length is <0.5% of total cavity length). Self-similar behaviour of the laser output is observable with the increase of pump power. The pulses have an energy of 22 nJ, an average power of 1.25 mW and a bandwidth of 2.4 nm. Therefore, a stable compact source of parabolic pulses is provided.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A laser apparatus for producing laser pulses comprising:
a gain medium in a fibre optical system, the gain medium having an output connectable to an input of the fibre optical system, the fibre optical system having an output connectable to an input of the gain medium to thereby form, when connected, a laser cavity,
the gain medium adapted to receive pulses characterised by a first state and output pulses characterised by a second state at an output, the first state being different to the second state,
wherein the fibre optical system is adapted to receive the pulses in the second state and output pulses in a state substantially similar to the first state.

2. A laser apparatus as claimed in claim 1 wherein the fibre optical system is adapted to output pulses in a state substantially similar to the first state by imparting an optical effect opposite to that imparted by the gain medium.

3. A laser apparatus as claimed in claim 1, wherein the gain medium is a Raman gain medium.

4. A laser apparatus as claimed in claim 1, wherein the gain medium is a doped fibre gain medium.

5. A laser apparatus as claimed in claim 1, wherein the pulses in at least the second state are substantially parabolic in temporal profile.

6. A laser apparatus as claimed in claim 1, wherein the pulses in at least the second state are substantially parabolic in spectral profile.

7. A laser apparatus as claimed in claim 1, wherein the pulses in the second state are broader in spectral and temporal profile that the pulses in the first state.

8. A laser apparatus as claimed in claim 1, wherein the fibre optical system comprises a temporal pulse selection device, the temporal pulse selection device adapted to select a portion of the temporal width of a pulse.

9. A laser apparatus as claimed in claim 8, wherein the temporal pulse selection device is adapted to select a portion of the spectral width of a pulse.

10. A laser apparatus as claimed in claim 8, wherein the temporal pulse selection device shortens the temporal width of a pulse by virtue of selecting a portion of the spectral width of the pulse.

11. A laser apparatus as claimed in claim 8, wherein the temporal pulse selection device is a band pass filter.

12. A laser apparatus as claimed in claim 8, wherein the temporal pulse selection device is a pulse recompression device.

13. A laser apparatus as claimed in claim 1, wherein the fibre optical system further comprises a mode locking device.

14. A laser apparatus as claimed in claim 13, wherein the mode locking device is a non linear optical loop mirror.

15. A laser apparatus as claimed in claim 14, wherein the non linear optical loop mirror comprises an optical coupler having at least two inputs, two outputs and a length of highly nonlinear fibre interposed between at least one of the inputs and one of the outputs.

16. A laser apparatus as claimed in claim 1, wherein the fibre optical system further comprises a band pass filter.

17. A laser apparatus as claimed claim 1, wherein the pulses in the second state are characterised by a linear positive chirp.

18. A laser apparatus as claimed in claim 1, wherein the gain medium comprises a length of optical fibre and a source of pump light, the pump coupled into and out of the optical fibre by an optical coupler.

19. A laser apparatus as claimed in claim 18, wherein the pump wavelength is tuneable to enable the wavelength of the pulses to be tuned.

20. A laser apparatus as claimed in claim 1, wherein the gain medium further comprises an optical isolator.

21. A laser apparatus as claimed in claim 1, wherein the laser apparatus further comprises an output coupler located at the output of the gain medium.

22. A laser apparatus as claimed in claim 21, wherein the output coupler is connected to a pulse recompression device.

23. A laser apparatus as claimed in claim 1, wherein the fibre optical system is closed by virtue of not comprising free space optical components.

24. A laser apparatus as claimed in claim 1, wherein the fibre optical system is closed by virtue of comprising fibre based components.

25. A laser apparatus as claimed in claim 1, wherein the fibre optical system comprises a fibre coupler defining an input to the fibre optical system and an output from the fibre optical system, the fibre coupler connectable to a temporal pulse selection device, the temporal pulse selection device connectable to a mode locking device, the mode locking device connectable to a gain medium and an optical isolator via an optical filter, the gain medium connectable to the fibre coupler.

26. A laser apparatus as claimed in claim 1, wherein the laser is operational to generate a pulse that propagates through the gain medium and the fibre optical system, wherein the pulses develop substantially the same temporal profile and spectral profile at each round trip.

27. A laser apparatus as claimed in claim 1, wherein the laser apparatus is operational substantially within the normal dispersion regime.

28. A laser apparatus as claimed in claim 1, wherein the laser comprises optical fibre based devices, silicon based devices, or some combination thereof.

29. A laser apparatus as claimed in claim 1, wherein the laser is operational to generate a pulse having a centre frequency located in, or substantially aligned with, the pass band of the filter.

30. An optical system for producing mode-locked laser pulses comprising:
   a gain medium,
   a fibre optical system, the fibre optical system comprising a mode locking device, a temporal pulse selection device and a spectral filter,
   wherein the gain medium has an output connected to an input of the fibre optical system, the fibre optical system having an output connected to an input of the gain medium to thereby form a laser cavity or ring, the gain medium adapted to receive pulses characterised by a first state and output pulses characterised by a second state at an output, the first state being different to the second state,
   wherein the fibre optical system is adapted to receive the pulses in the second state and output pulses in a state substantially similar to the first state.

31. A method of operating a laser apparatus comprising:
   providing a fibre optical system and a gain medium,
   optically coupling the fibre optical system to a gain medium to form a laser cavity or ring,
   adapting the gain medium to receive pulses characterised by a first state and output pulses characterised by a second state at an output, and
   adapting the fibre optical system to receive a pulse characterised by the first state and output pulses characterised by the first state.

32. The method as claimed in claim 31 further comprising imparting, in the fibre optical system, an optical effect opposite to that imparted by the gain medium.

33. The method as claimed in claim 31, wherein the optical effect in the gain medium is broadening the spectral width of the pulse and the optical effect in the fibre optical system is narrowing the spectral width of the pulse.

34. The method as claimed in claim 31, wherein said gain medium operates to support pulses characterised by a linear positive chirp.

35. The method as claimed in claim 31, wherein said fibre optical system operates to support pulses characterised by a linear positive chirp.

36. The method as claimed in claim 31, wherein the gain medium operates to produce pulses in the second state that are broader in spectral and temporal profile than the pulses in the first state.

37. The method as claimed in claim 31, wherein providing a fibre optical system comprises providing a temporal pulse selection device, the temporal pulse selection device adapted to select a portion of the spectral and/or temporal width of a pulse.

38. The method as claimed in claim 37, wherein the temporal pulse selection device shortens the temporal width of a pulse by virtue of selecting a portion of the spectral width of the pulse.

39. The method as claimed in claim 31, wherein providing a fibre optical system comprises providing a band pass filter as the temporal pulse selection device.

40. The method as claimed in claim 31, wherein the method comprises providing a mode locking device.

41. The method as claimed in claim 40, wherein the method comprises mode locking the laser with the mode locking device.

42. The method as claimed in claim 31, wherein the method comprises outputting light from the laser by providing an optical coupler having at least two inputs, two outputs and a length of highly nonlinear fibre interposed between at least one of the inputs and one of the outputs.

43. The method as claimed in claim 31, wherein the method further comprises tuning a centre wavelength of the pulses by providing a band pass filter in the fibre optical system.

44. The method as claimed in claim 31, wherein the method further comprises preventing reverse pulse propagation by providing a optical isolator in the fibre optical system.

45. The method as claimed in claim 31, wherein the method further comprises providing a fibre coupler defining an input to the fibre optical system and an output from the fibre optical system, connecting the fibre coupler to a temporal pulse selection device, connecting the temporal pulse selection device to a mode locking device, connecting the mode locking device to a filter and selecting an operating wavelength, connecting the filter to a gain medium and optical isolator, and connecting the gain medium to the fibre coupler.

46. The method as claimed in claim 31, wherein the method further comprises operating the laser to generate a pulse that propagates through the gain medium and the fibre optical system, wherein the pulses develop substantially the same temporal profile and spectral profile at each round trip.

47. The method as claimed in claim 31, wherein the method further comprises propagating a pulse in the cavity or ring substantially within the normal dispersion regime.

* * * * *